(12) United States Patent
Elaydi et al.

(10) Patent No.: US 7,707,450 B1
(45) Date of Patent: Apr. 27, 2010

(54) TIME SHARED MEMORY ACCESS

(75) Inventors: Abdul Elaydi, Santa Clara, CA (US);
Saeed Azimi, Union City, CA (US); Yun Yang, Milpitas, CA (US)

(73) Assignee: Marvell International Ltd., Hamilton (BM)

( * ) Notice: Subject to any disclaimer, the term of this patent is extended or adjusted under 35 U.S.C. 154(b) by 996 days.

(21) Appl. No.: 10/930,004

(22) Filed: Aug. 30, 2004

Related U.S. Application Data

(60) Provisional application No. 60/577,956, filed on Jun. 8, 2004.

(51) Int. Cl.
*G06F 1/04* (2006.01)
(52) U.S. Cl. ...................... 713/600; 711/167
(58) Field of Classification Search .................. 713/500, 713/501, 322, 600; 711/104, 167; 345/503
See application file for complete search history.

(56) References Cited

U.S. PATENT DOCUMENTS

| | | | | |
|---|---|---|---|---|
| 5,173,901 A | * | 12/1992 | DeSomer | 370/396 |
| 6,076,171 A | * | 6/2000 | Kawata | 713/501 |
| 6,515,670 B1 | * | 2/2003 | Huang et al. | 345/503 |
| 6,530,001 B1 | * | 3/2003 | Lee | 711/154 |
| 6,564,329 B1 | * | 5/2003 | Cheung et al. | 713/322 |
| 6,763,478 B1 | * | 7/2004 | Bui | 713/600 |
| 2001/0003198 A1 | * | 6/2001 | Wu | 711/104 |

* cited by examiner

*Primary Examiner*—Chun Cao

(57) ABSTRACT

Apparatus and method are provided for accessing information in a storage area including a storage area which is accessible by a first buss and a second buss. The access by the first buss is clocked by a first clock signal and the access by the second buss is clocked by a second clock signal. The first clock signal has a first clock frequency and the second clock signal has a second clock frequency. A terminal receives a base clock signal having a frequency of at least the sum of the first clock frequency and the second clock frequency. An access to the storage area by the first or second buss is made during a cycle of the base clock.

45 Claims, 5 Drawing Sheets

| CPU\SYS | 10 | 20 | 30 | 40 |
|---|---|---|---|---|
| 10 | 120 | 120 | 120 | 160 |
| 20 | 120 | 120 | 120 | 160 |
| 30 | 120 | 120 | 120 | 120 |
| 40 | 160 | 160 | 120 | 160 |
| 60 | 120 | 120 | 120 | 120 |
| 80 | 160 | 160 | 120 | 160 |
| 120 | 160 | 160 | 160 | 160 |

TIME SHARED MEMORY ACCESS

REFERENCE TO FIRST APPLICATION

The present application claims priority to commonly assigned U.S. Provisional Patent Application No. 60/577,956, entitled "Clock Generator," filed on Jun. 8, 2004, which is hereby incorporated by reference in its entirety.

BACKGROUND OF THE INVENTION

1. Field of the Invention

The present invention relates to clock schemes in computer systems and memory devices, and in particular to a memory capable of being time-shared by multiple masters using different clocks.

2. Description of Related Art

FIG. 1 illustrates a technique for accessing three random access memories (RAMs): DSRAM 2 (for storing Data), an ISRAM 3 (for storing instructions) and data buffer 7 (for buffering data). DSRAM 2 and ISRAM 3 communicate directly with central processing unit (CPU) 1 via busses 12 and 11, respectively, at the CPU's clock rate frequency. Since RAMs 2 and 3 are directly accessible by the CPU they each have a zero wait access time.

Data buffer 7 is a general purpose data buffer in communication with memory buss 6. Typically memory buss 6 (or System Buss) has a slower clock rate frequency different from that of CPU 1. In addition, data buffer 7 typically has a slower access time than DSRAM 2 and ISRAM 3 because it has lower bandwith requirements. Generally, this is because the buffer 7 supports devices that are slower than the CPU 1.

Memory buss 6 communicates with CPU peripheral buss 4 via a bridge 5. A controller, such as hard disk drive controller 8, controls a disk drive 9. Typically, data flowing to and from a device temporarily is stored in data buffer 7. Thus, a data transfer between the CPU and Disk drive, for instance, traverses a CPU buss 4, a bridge 5, a memory buss 6, and a data buffer 7. A host terminal 10 is in communication with memory buss 6 as well and communicates to the CPU 1 in the same manner.

The size of both the instruction RAM 3 and data buffer 7 are chosen individually. The size of instruction RAM 3 depends upon the maximum program size executed by the CPU, while the size of the data buffer 7 depends upon the data transfer requirements of the application. Once chosen, unless a hardware change is made, the sizes of the instruction RAM 3 and memory 7 are inflexible. A designer therefore must know a priori the size of the instruction set and the transfer requirements for a particular application. Compromises generally are made, making such a selection process an inefficient solution.

Sometimes instruction RAM 3 falls short of the size necessary to store a program (e.g., code). In this case, a portion of data buffer 7 must be allocated to store a portion of the instruction set. Since the CPU does not have direct access to the data buffer 7, it cannot obtain instruction codes stored in a zero access wait time as it could have if it were coupled directly to the memory.

On the other hand, more buffer space may be required to handle larger data transfers. If the data buffer memory 7 is too small, data must be segmented, resulting in lower transfer rates. Accordingly, the memory configuration illustrated in FIG. 1 is inefficient.

There is a need to provide a more flexible memory, and for a configuration which provides a simpler way of allocating memory. There also is a need to provide for controlling such memory allocation in software, and for a memory access technique which is efficient and energy conserving.

SUMMARY

It is an object of the present invention is to provide a simpler configuration for allocating memory. It is also an object of the present invention to provide a more flexible memory. Another object of the present invention to provide improved apparatus and method for accessing a memory. It is also an object of the present invention to control such memory allocation in software. It is also an object of the present invention to provide a memory access technique which is efficient and energy conserving.

In accordance with one embodiment of the present invention there is provided a memory device for storing information including a storage area which is accessible by a first buss and a second buss. The access by the first buss is clocked by a first clock signal and the access by the second buss is clocked by a second clock signal. The first clock signal has a first clock frequency and the second clock signal has a second clock frequency. A terminal receives a base clock signal having a frequency of at least the sum of the first clock frequency and the second clock frequency. An access to the storage area by the first and/or second buss is made during a cycle of the base clock.

In accordance with another embodiment of the present invention a method for accessing a memory device is provided. The method includes accessing a storage area by a first buss being clocked by a first clock signal having a first clock frequency and accessing the storage area by a second buss being clocked by a second clock signal having a second clock frequency. A step for receiving a base clock signal having a frequency of at least the sum of the first clock frequency and the second clock frequency is also provided. An access to the storage area by the first buss and/or second buss is made during a cycle of the base clock.

28. Another embodiment of the present invention provides an apparatus for accessing a memory device, including means for accessing a storage area by a first buss being clocked by a first clock signal having a first clock frequency. Also included are means for accessing the storage area by a second buss being clocked by a second clock signal having a second clock frequency. Means are provided for receiving a base clock signal having a frequency of at least the sum of the first clock frequency and the second clock frequency. The accessing to the storage area by the first buss and/or second buss is made during a cycle of the base clock.

DETAILED DESCRIPTION OF THE INVENTION

Various embodiments of the time-sharing access method and apparatus according to the present invention will now be described in detail with reference to the accompanying drawings.

The present invention provides a single memory which is used as both a data buffer and a CPU memory. Advantageously, the memory can be manufactured on one die. Any type of memory (e.g., SRAM, DRAM, or the like) could be used and still be within the scope of the invention. In the embodiments discussed below, SRAM is selected merely to illustrate an embodiment of the present invention.

The single SRAM is accessible directly by the CPU at the CPU's clock rate frequency. In addition, the SRAM is accessible by the memory buss 6 at the system's ("SYS") clock frequency which can have the same or different clock rate frequency than the CPU. Faster data transfer and access rates as well as greater flexibility in memory allocation are provided a single SRAM that can be apportioned in software code executed by the CPU.

Figure 1:
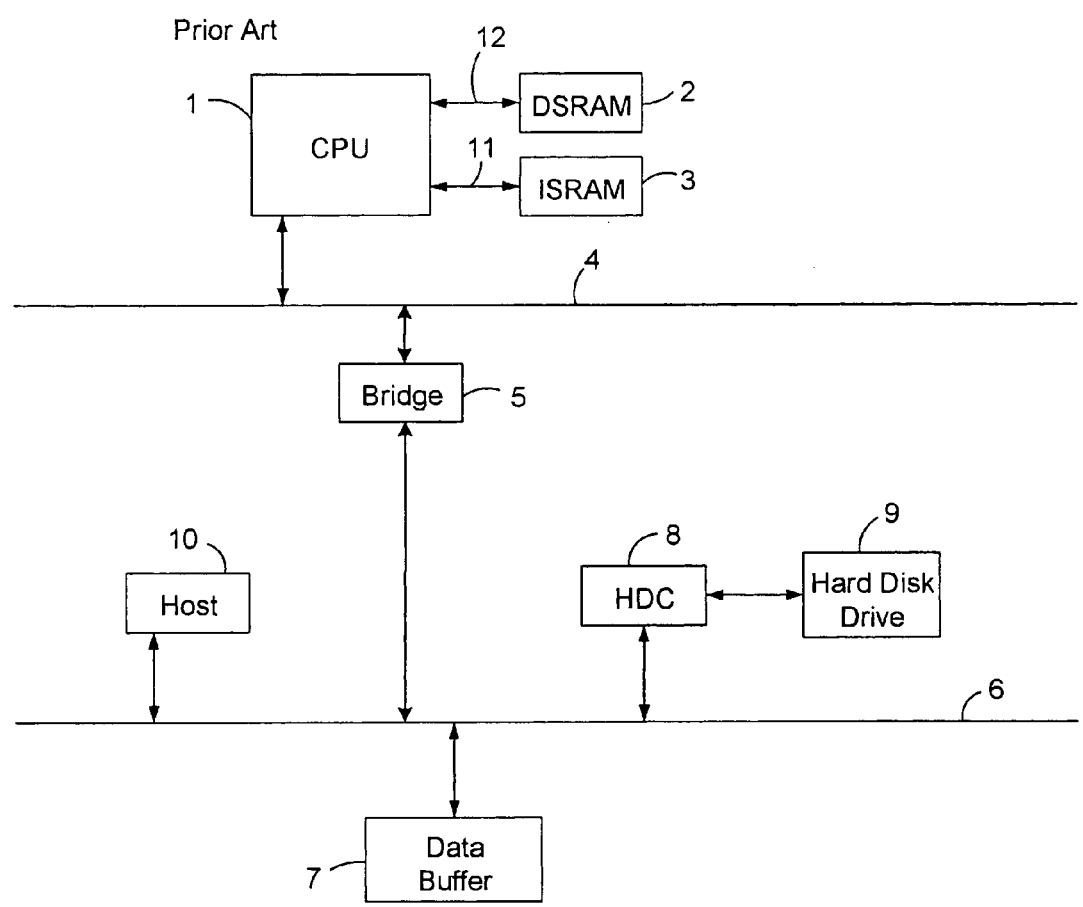
FIG. 1 is a block diagram of a prior art system.
Figure 2:
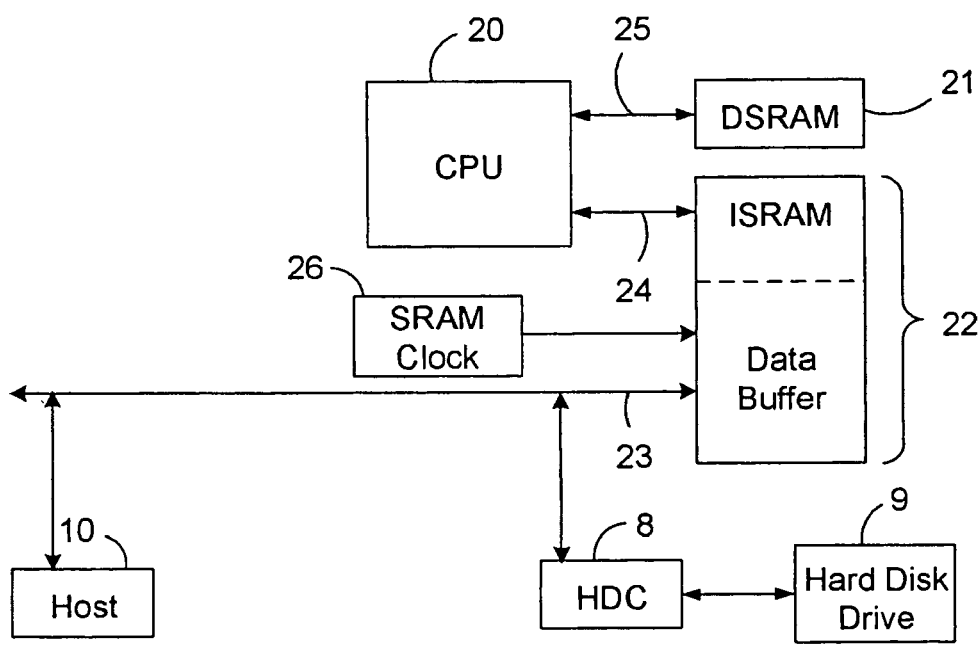
FIG. 2 illustrates an embodiment of the present invention.

FIG. 2 illustrates an embodiment of the present invention. One SRAM 22 is apportioned as CPU instruction RAM ("ISRAM") and as a data buffer ("Data Buffer"). ISRAM stores CPU instructions used by the CPU and the data buffer is used to store data temporarily. The dashed line between the two is imaginary and is not fixed. The ratio of data buffer to instruction RAM ("ISRAM") is adjusted in software. In addition, a DSRAM 21 communicates directly with CPU 20 via buss 25.

The CPU buss 24 and the memory buss 23 are controlled by two separate clocks, which may or may not have the same clock frequencies. The CPU buss runs at the CPU's clock frequency and the memory buss 23 runs at the system ("SYS") clock frequency. Both the ISRAM and data buffer portions are accessible by the CPU 20 with a zero access wait time. In addition SRAM 22 is accessible by the memory buss 23. This is accomplished using time-shared accesses. Running at higher frequency the SRAM is able to time-share between the CPU and SYS clocks.

SRAM grants uninterruptible accesses to both its CPU and SYS masters. In particular, the SRAM 22 provides back-to-back responses to the SYS and CPU clocks by providing time-shared accesses, where the SRAM runs at a frequency the same as or higher than the sum of both the CPU and SYS clock frequencies. The SRAM clock frequency is referred to herein as the SRAM base frequency. A separate SRAM clock signal 26 running at the base frequency is supplied to the SRAM. It should be understood that the clocks described herein can be derived from a single clock source for ease of design implementation. Alternatively, individual clock sources can be used.

Figures 3, 4:
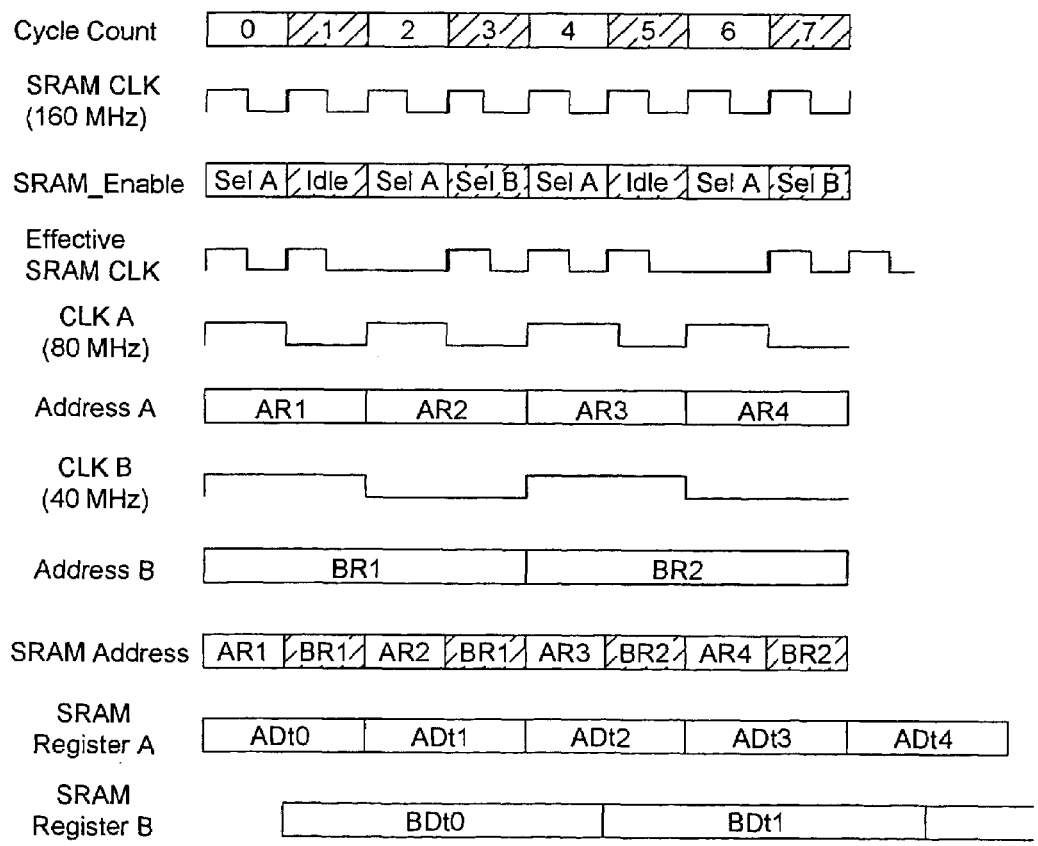
FIG. 3 is an illustrative table showing how the SRAM frequency is determined in accordance with the present invention.
FIG. 4 depicts a set of exemplary memory interface timing factors in accordance with the present invention.

FIG. 3 is an illustrative table showing how the SRAM frequency is determined. The SRAM frequency is determined based on the SYS and CPU frequencies. In particular, SRAM frequency is an even multiple of both SYS and CPU frequencies. For ease of implementation, the SRAM frequency can be higher than an exact sum. In this example, SYS and CPU clocks are all derived from the same base system clock which has a clock speed of 480 MHz. Thus, although a multiple of a CPU clock rate of 80 MHz and a SYS clock rate of 40 MHz is 120 MHz, a clock rate of 160 MHz is used because it is easily extracted from a 480 MHz base system clock.

FIG. 4 depicts a set of exemplary memory interface timing factors in accordance with the present invention. CLK A and CLK B represent CPU buss and SYS buss clock rates, respectively. CLK A could just as easily represent the SYS buss clock rate and CLK B could represent the CPU buss rate. CLK A is the rate at which the CPU ISRAM portion of SRAM 22 is accessed by CPU 20 and CLK B is the rate at which the data buffer portion of SRAM 22 is accessed by memory buss 23.

Cycle Count represents time periods corresponding to the SRAM base frequency, SRAM CLK, which is selected according to CLK A and B frequencies as follows. SRAM CLK is a multiple of CLKs A and B. However, for ease of implementation in extracting clock signals from a base system clock, SRAM CLK can be higher. In the case shown in FIG. 4, CLK A is 80 MHz and CLK B is 40 MHz and the SRAM 22 is running at a base frequency of 160 MHz.

As shown in FIG. 4, CLK A uses half the bandwidth of the base frequency. CLK B needs only two out of the eight cycles. In the example, cycles 3 and 7 were chosen to be those two cycles. In other words, as long as CLK B makes two accesses to the SRAM, the two cycle requirement is satisfied.

The accesses need not run at the full SRAM base frequency. Here, the effective SRAM clock rate ("Effective SRAM CLK" in FIG. 4) is 120 MHz.

The effective SRAM clock rate is calculated as follows. The SRAM portion accessed by CLK A is accessed 4 out of the 8 cycles. The SRAM portion accessed by CLK B is accessed 2 out of the 8 cycles. Thus SRAM 22 is selected 6 out of the 8 cycles. In this example, the SRAM base clock has a frequency of 160 MHz. Thus, the effective SRAM clock is 6/8*160=120 MHz. In this case the effective SRAM clock happens to be the sum of the SYS and CPU frequencies.

SRAM Address selects an address, such as the SRAM, CPU or SYS address. SRAM_Enable provides a signal to enable the SRAM. For example, during Cycle Count 0, CLK A is accessing the SRAM (e.g., "Sel A") and during cycle count 3 CLK B is accessing the SRAM (e.g., "Sel B"). Corresponding address and data lines are idle during periods 1 and 5. Address A and Address B are active for addressing the memory accordingly.

As explained above, the SRAM Address accesses the SRAM. They signals are multiplexed from the CPU and SYS addresses using the SRAM Address select signal. The SRAM Register A is used to store or hold data for CPU accesses, and the SRAM Register B is used to store or hold data for SYS accesses.

Figure 5:
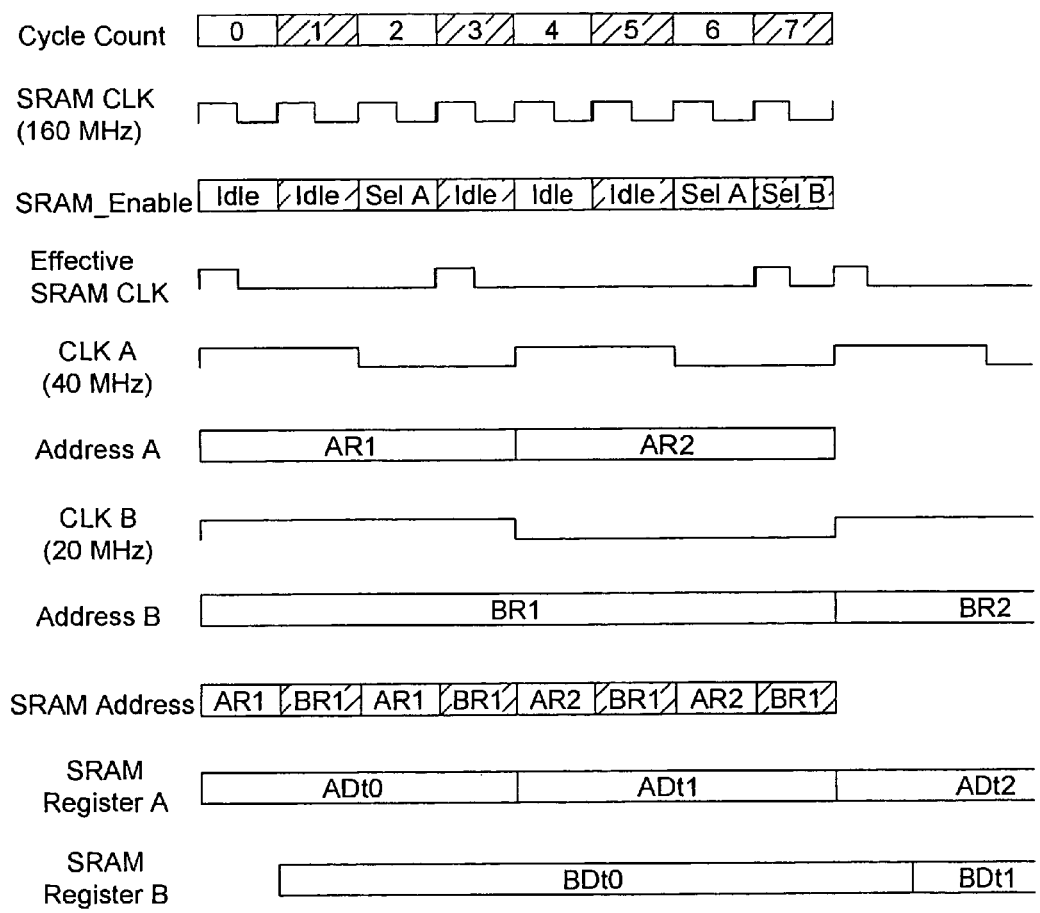
FIG. 5 depicts another set of exemplary memory interface timing factors in accordance with the present invention.

FIG. 5 depicts another set of exemplary memory interface timing factors in accordance with the present invention. Here, CLK A is 40 MHz and CLK B is 20 MHz. As shown CLK A requires only two cycles, cycle counts 2 and 6, to access the SRAM 22. That is, CLK A accesses the SRAM 2 out of 8 cycles. CLK B needs only one cycle, cycle count 7, to access the SRAM (i.e., 1 out of 8 cycles). Accordingly, the effective SRAM clock rate ("Effective SRAM CLK" in FIG. 5) is 3/8*160 MHz=60 MHz. When the memory is idle no access takes place and therefore no power is wasted. The SRAM Address, SRAM Register A and SRAM Register B signals are the same as described above with respect to FIG. 4.

Figure 6:
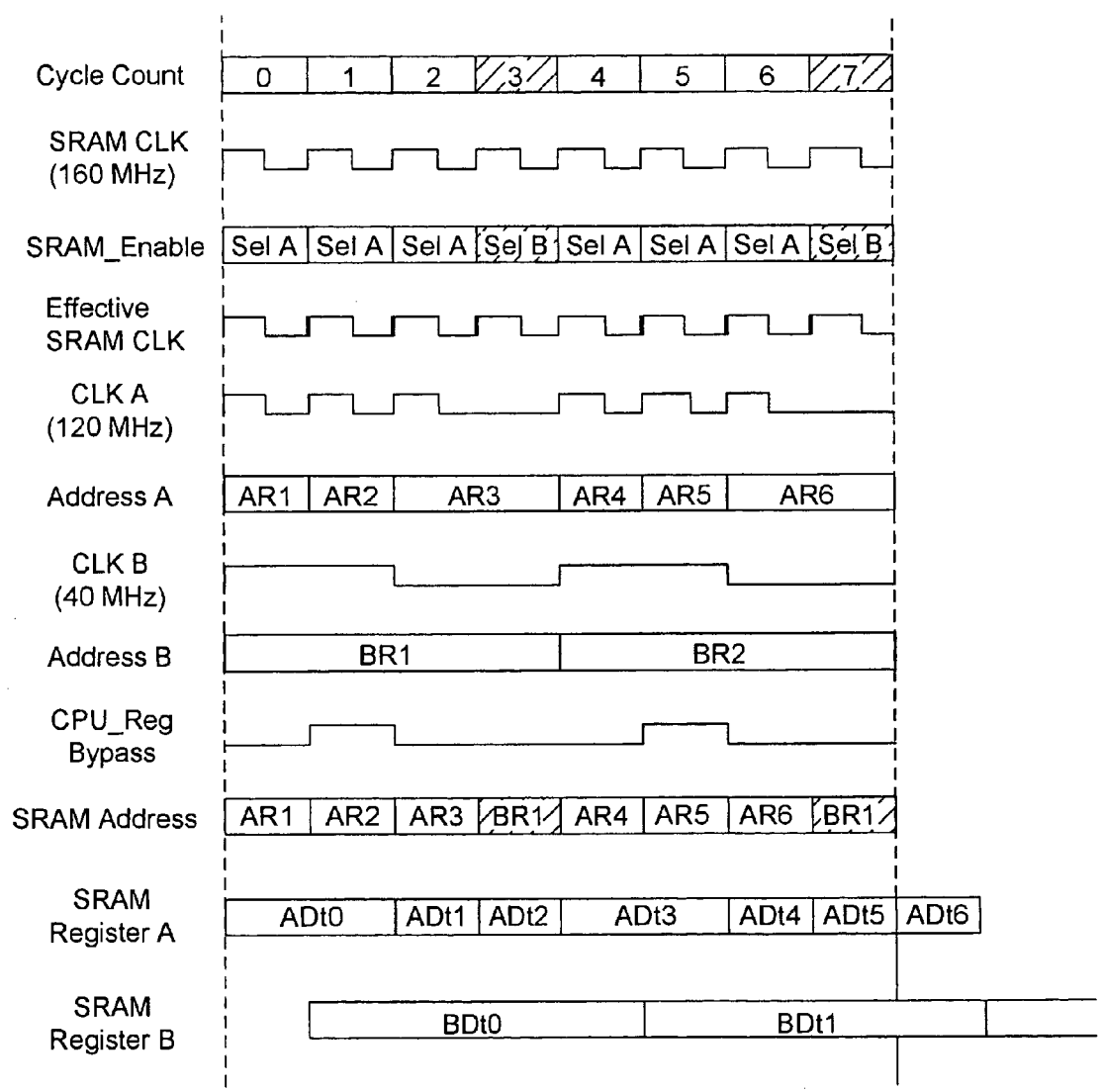
FIG. 6 depicts another set of exemplary memory interface timing factors in accordance with the present invention where one of the clocks has a rate greater than one half the base frequency clock rate.

FIG. 6 depicts another set of exemplary memory interface timing factors in accordance with the present invention where one of the clocks is time sharing the SRAM higher than one half the SRAM base frequency. Here CLK A has a frequency of 120 MHz and CLK B has a frequency of 40 MHz and the SRAM base frequency is 160 MHz.

The edges of CLK A are aligned with the edges of the SRAM CLK. This is accomplished by gating CLK A to add dead cycles. As shown in FIG. 6, CLK A is running at 160 MHz for only 3 out of 4 cycles. The fourth cycle is dead (i.e., cycle "3"). The frequency of CLK A is therefore 3/4*160 MHz=120 MHz. Thus the effective frequency of CLK A is still lower than the SRAM base frequency and the total memory access rate is 160 MHz.

A variation of this embodiment gives back the missing cycle to CLK A when CLK B is not need. Thus, if the CPU needs to access the SRAM during a cycle allocated to the memory buss and the memory buss does not need to access the memory at that time, that access time is allotted to the CPU buss by not gating CLK A at that time. Alternatively, when the CPU is given back these missing cycles, it can perform other operations, such as arithmetic operations and thus use the extra cycles for processor activities other than accessing memory.

The CPU_Reg Bypass signals the logic to inhibit use of the data from register A and instead use it directly from the SRAM output. This occurs when the CPU clock runs at a frequency that is greater than one half the SRAM clock. At such a time the CPU clock is (at least) momentarily the same rate as the SRAM clock for at least two of its cycles. At that time (i.e., when the CPU's clock is running as fast as the SRAM) the data in Register A is bypassed and the CPU master receives the data directly from the SRAM.

The SRAM Address, SRAM Register A and SRAM Register B signals are the same as described above with respect to FIG. 4.

As shown above, each configuration results in the effective SRAM CLK having the same or lower frequency than the base frequency (i.e., SRAM CLK). In addition, the SRAM is not enabled (i.e., SRAM_Enable) during each cycle count. When the SRAM is not enabled (i.e., it is idle), power is not utilized and thus energy is conserved. In addition, since the SRAM is directly coupled to both the CPU and memory busses, the wait state access times can be reduced. In some cases the wait state is entirely eliminated to a zero access wait time.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A memory device for storing information, comprising:
 a storage area connected to a first buss and to a second buss, and accessible by the first buss and by the second buss, the access by the first buss being clocked by a first clock signal and the access by the second buss being clocked by a second clock signal, the first clock signal having a first clock frequency and the second clock signal having a second clock frequency; and
 an input operable to receive a base clock signal having a frequency of at least the sum of the first clock frequency of the first clock signal and the second clock frequency of the second clock signal, wherein an access to the storage area by at least one of the first buss and second buss is made during a cycle of the base clock signal.

2. A memory device according to claim 1, wherein the first clock frequency and the second clock frequency are the same.

3. A memory device according to claim 1, wherein the first clock frequency and the second clock frequency are different.

4. A memory device according to claim 1, wherein the storage area is divided into two portions having a variable size ratio.

5. A memory device according to claim 4, wherein a first portion of the storage area stores an instruction set and a second portion of the storage area stores buffered data.

6. A memory device according to claim 1, wherein the first buss is a CPU peripheral buss and the second buss is a memory buss.

7. A memory device according to claim 1, wherein an unused cycle is accessed by at least one of the first buss and the second buss.

8. A memory device according to claim 7, wherein at least one of the first buss and the second buss are at the same speed as an SRAM clock.

9. A memory device according to claim 7, wherein a device on at least one of the first buss and the second buss performs an internal operation.

10. A memory device according to claim 9, wherein the device is a CPU.

11. A memory device according to claim 1, further comprising:
 a gate operable to add a dead cycle to one of the first clock signal and the second clock signal.

12. A memory device according to claim 1, wherein at least one clock source generates at least one of the first clock signal, the second clock signal and the base clock signal.

13. A processor based system comprising the memory device of claim 1.

14. A hard disk controller comprising the memory device of claim 1.

15. A hard disk according to claim 14, further comprising:
 a disk drive controlled by said hard disk controller.

16. A method for accessing a memory device, comprising the steps of:
 accessing a storage area by a first buss connected to the storage area, such access being clocked by a first clock signal having a first clock frequency;
 accessing the storage area by a second buss connected to the storage area, such access being clocked by a second clock signal having a second clock frequency;
 receiving a base clock signal having a frequency of at least a sum of the first clock frequency of the first clock signal and the second clock frequency of the second clock signal; and
 wherein the accessing to the storage area by at least one of the first buss and second buss is made during a cycle of the base clock signal.

17. A method according to claim 16, wherein the first clock frequency and the second clock frequency are the same.

18. A method according to claim 16, wherein the first clock frequency and the second clock frequency are different.

19. A method according to claim 16, wherein the storage area is divided into two portions having a variable size ratio.

20. A method according to claim 19, wherein a first portion of the storage area stores an instruction set and a second portion of the storage area stores buffered data.

21. A method according to claim 16, wherein the first buss is a CPU peripheral buss and the second buss is a memory buss.

22. A method according to claim 16, further comprising the step of:
 accessing an unused cycle by at least one of the first buss and the second buss.

23. A method according to claim 22, wherein at least one of the first buss and the second buss are at the same speed as an SRAM clock.

24. A method according to claim 22, further comprising:
performing an internal operation on a device on at least one of the first buss and the second buss.

25. A method according to claim 24, wherein the device is a CPU.

26. A method according to claim 16, further comprising the step of:
adding a dead cycle to one of the first clock signal and the second clock signal.

27. A method according to claim 16, further comprising the step of:
generating from at least one clock source at least one of the first clock signal, the second clock signal and the base clock signal.

28. An apparatus for accessing a memory device, comprising:
means for accessing a storage area by a first buss connected to the storage area, such access being clocked by a first clock signal having a first clock frequency;
means for accessing the storage area by a second buss connected to the storage area, such access being clocked by a second clock signal having a second clock frequency;
means for receiving a base clock signal having a frequency of at least a sum of the first clock frequency of the first clock signal and the second clock frequency of the second clock signal; and
wherein the accessing to the storage area by at least one of the first buss and second buss is made during a cycle of the base clock signal.

29. An apparatus according to claim 28, wherein the first clock frequency and the second clock frequency are the same.

30. An apparatus according to claim 28, wherein the first clock frequency and the second clock frequency are different.

31. An apparatus according to claim 28, wherein the storage area is divided into two portions having a variable size ratio.

32. An apparatus according to claim 31, wherein a first portion of the storage area stores an instruction set and a second portion of the storage area stores buffered data.

33. An apparatus according to claim 28, wherein the first buss is a CPU peripheral buss and the second buss is a memory buss.

34. An apparatus according to claim 28, further comprising:
means for accessing an unused cycle by at least one of the first buss and the second buss.

35. An apparatus according to claim 34, wherein at least one of the first buss and the second buss are at the same speed as an SRAM clock.

36. An apparatus according to claim 34, further comprising:
means for performing an internal operation on a device on at least one of the first buss and the second buss.

37. An apparatus according to claim 36, wherein the device is a CPU.

38. An apparatus according to claim 28, further comprising:
gate means for adding a dead cycle to one of the first clock signal and the second clock signal.

39. An apparatus according to claim 28, further comprising:
at least one clock means for generating at least one of the first clock signal, the second clock signal and the base clock signal.

40. A processor based system comprising the apparatus of claim 28.

41. A hard disk controller comprising the apparatus of claim 28.

42. A hard disk according to claim 41, further comprising:
a disk drive controlled by the hard disk controller.

43. A memory device according to claim 1, further comprising:
a signal provider to enable interleaved access for the first buss and the second buss.

44. A method according to claim 16, further comprising: the step of:
enabling interleaved access for the first buss and the second buss.

45. An apparatus according to claim 28, further comprising:
means for enabling interleaved access for the first buss and the second buss.

* * * * *